(12) United States Patent
Tanaka

(10) Patent No.: US 7,591,599 B2  
(45) Date of Patent: Sep. 22, 2009

(54) DIGITAL CAMERA SYSTEM AND DIGITAL CAMERA

(75) Inventor: Hiroshi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 421 days.

(21) Appl. No.: 11/542,543

(22) Filed: Oct. 4, 2006

(65) Prior Publication Data

US 2007/0086778 A1    Apr. 19, 2007

(30) Foreign Application Priority Data

Oct. 5, 2005    (JP)    ............................. 2005-292043

(51) Int. Cl.
*G03B 17/00* (2006.01)
*H04N 5/232* (2006.01)
*H04N 5/76* (2006.01)

(52) U.S. Cl. ................ 396/529; 348/211.14; 348/231.7

(58) Field of Classification Search ......... 396/529–532, 396/535; 348/231.6, 231.7, 207.1, 211.14, 348/360; 359/819
See application file for complete search history.

(56) References Cited

U.S. PATENT DOCUMENTS

2004/0202464 A1*  10/2004  Miyasaka et al. ........... 396/529

2006/0056049 A1*  3/2006  Tokiwa et al. ............... 359/684

FOREIGN PATENT DOCUMENTS

| JP | 10-191122 | * | 7/1998 |
| JP | 10-191122 A | | 7/1998 |
| JP | 10-233953 A | | 9/1998 |
| JP | 2000-050138 A | | 2/2000 |
| JP | 2000-106640 A | | 4/2000 |

* cited by examiner

*Primary Examiner*—Patrick J Assouad  
*Assistant Examiner*—Minh Q Phan  
(74) *Attorney, Agent, or Firm*—Sughrue Mion, PLLC

(57) ABSTRACT

A digital camera system is composed of a camera body and a lens unit removably attached to the camera body. The lens unit has a timing generator (TG) for controlling drive timing of each part of the lens unit. The camera body also has a TG for controlling drive timing of each part of the camera body. When a still image capture mode or a movie capture mode is selected by a mode selection dial, a camera controller switches to a first mode for operating the camera body side TG in synchronization with the lens side TG. When a playback mode is selected, the camera controller switches to a second mode for operating the camera body side TG without synchronizing with the lens side TG.

5 Claims, 8 Drawing Sheets

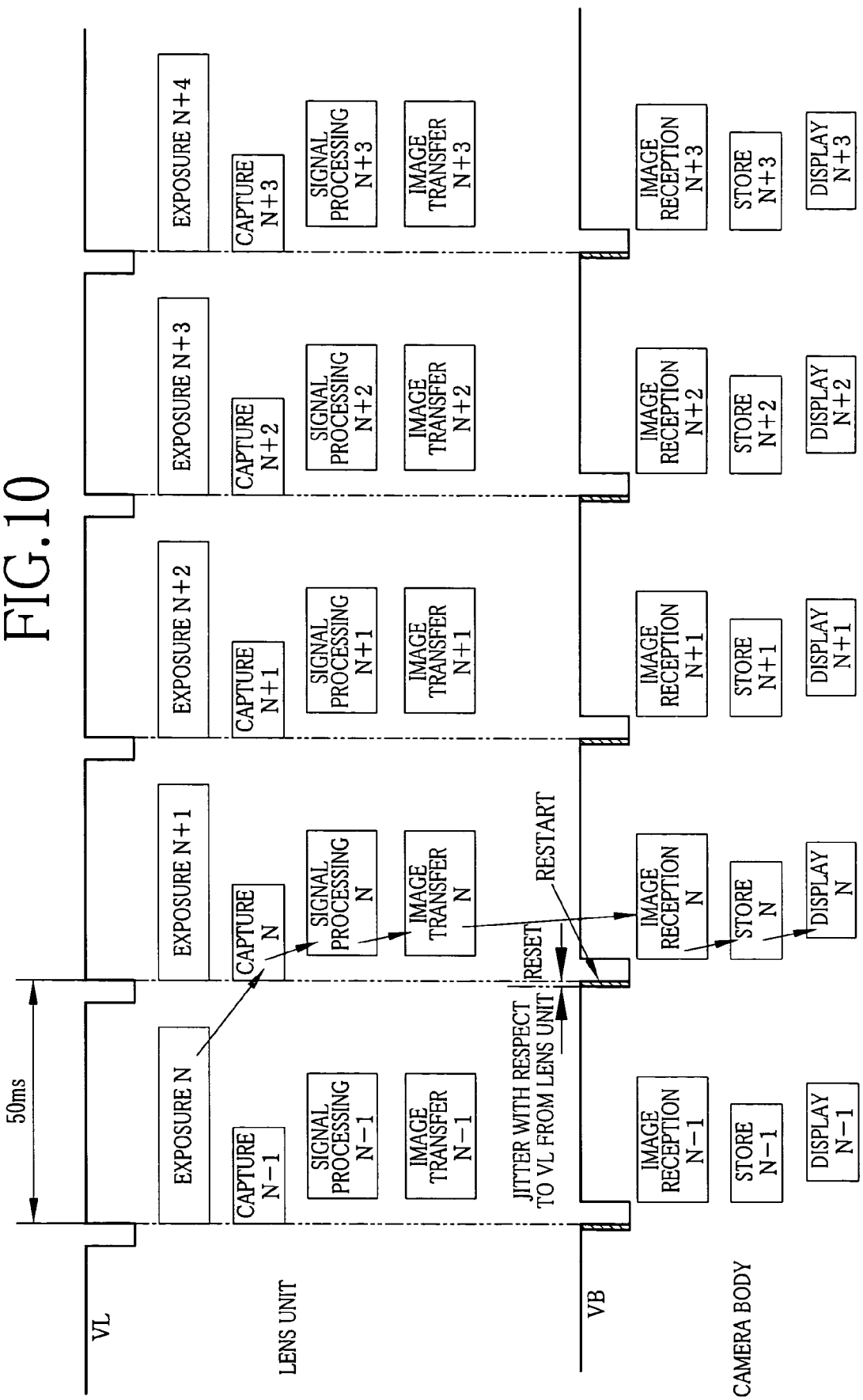

DIGITAL CAMERA SYSTEM AND DIGITAL CAMERA

BACKGROUND OF THE INVENTION

1. Field of the Invention

The present invention relates to a digital camera system and a digital camera in which a lens unit having a taking lens and a solid state imaging device is removably attached to a camera body.

2. Description Related to the Prior Art

A digital camera is widely used, and includes a solid state imaging device such as a CCD image sensor for capturing an image to store data of the image to a data storage. A digital camera system in which a lens unit having a taking lens and a solid state imaging device is removably attached to a camera body is also known (for example, Japanese patent laid-open publication Nos. 10-191122, 10-233953, 2000-50138 and 2000-106640).

In digital camera systems disclosed in the above publications, a desired lens unit is selected from among various lens units with different focal lengths of taking lens or with different types of solid state imaging device, and the selected lens unit is attached to a camera body.

Moreover, in the digital camera systems disclosed in JP-A 10-191122 and JP-A 2000-50138, the camera body controls timing for activating each part of the digital camera system, and the lens unit works in accordance with a timing signal generated by the camera body. However, a suitable timing signal varies widely according to the type of the solid state imaging device. It is therefore difficult to provide versatility with the camera body to be able to drive various kinds of lens units.

In the digital camera system disclosed in JP-A 10-233953, the problem like the above publications have does not arise since the lens unit has a built-in timing generator. However, synchronization of operations between the lens unit and the camera body is not taken into account. The synchronization of the same is not considered in JP-A 2000-106640 as well.

SUMMARY OF THE INVENTION

In view of the foregoing problems, an object of the present invention is to provide a digital camera system and a digital camera capable of synchronizing operations of a lens unit and a camera body regardless of kind of the lens unit.

In order to achieve the above and other objects, a digital camera system of the present invention is composed of a lens unit having a taking lens and a solid state imaging device, and a camera body to which the lens unit is removably attached. The lens unit has a lens side timing generator and the camera body has a camera body side timing generator, and one of the lens unit and the camera body has a mode selector. The lens side timing generator controls drive timing of each part of the lens unit. The camera body side timing generator controls drive timing of each part of the camera body. The mode selector selects one of a first mode (lens-led type) and a second mode (camera body-led type). In the first mode, operation of the camera body side timing generator is controlled by the lens side timing generator. In the second mode, the operation of the camera body side timing generator is not controlled by the lens side timing generator.

It is preferable that the mode selector selects the first mode when an image capture mode is selected, whereas the mode selector selects the second mode when a mode other than the image capture mode is selected.

Moreover, the lens side timing generator has an output terminal for outputting a reset signal which resets the camera body side timing generator and the camera body side timing generator has an input terminal for receiving the reset signal. The camera body side timing generator is restarted and generates a predetermined timing pattern when the reset signal is input to the input terminal while the first mode is selected by the mode selector.

The lens unit has a first contact connected to the output terminal and the camera body has a second contact connected to the input terminal. When the lens unit is attached to the camera body, the first and second contacts make a contact with each other, and the output and input terminals are electrically connected to each other.

The reset signal is preferably a vertical synchronizing signal generated by the lens side timing generator for driving the solid state imaging device.

A digital camera of the present invention to which a lens unit having a taking lens, a solid state imaging device and a lens side timing generator is removably attached includes a camera body side timing generator and a mode selector. The camera body side timing generator controls drive timing of each part of the digital camera. The mode selector selects one of a first mode and a second mode. In the first mode, operation of the camera body side timing generator is controlled by the lens side timing generator. In the second mode, the operation of the camera body side timing generator is not controlled by the lens side timing generator.

According to the present invention, the operations of the lens unit and the camera body can be synchronized regardless of kind of the lens unit.

Since the first mode is selected when capturing images, the camera body side timing generator does not need to generate a timing signal corresponds to each kind of the solid state imaging device. Owing to this, the camera body can correspond to various lens units with different types of the solid state imaging device, thereby improving its versatility.

In the first mode, the reset signal output from the lens side timing generator is input to the camera body side timing generator. Therefore, the camera body side timing generator can be synchronized with the lens side timing generator. This reset signal is the vertical synchronizing signal, and therefore it is unnecessary to generate any new signals as the reset signal.

BRIEF DESCRIPTION OF THE DRAWINGS

The above objects and advantages of the present invention will become more apparent from the following detailed description when read in connection with the accompanying drawings, in which:

FIG. 10 is a flow chart explaining the synchronization processing between the operation of the lens unit and the operation of the camera body with V-cycle at 50 ms when the through image is displayed.

DETAILED DESCRIPTION OF THE PREFERRED EMBODIMENTS

Figure 1:
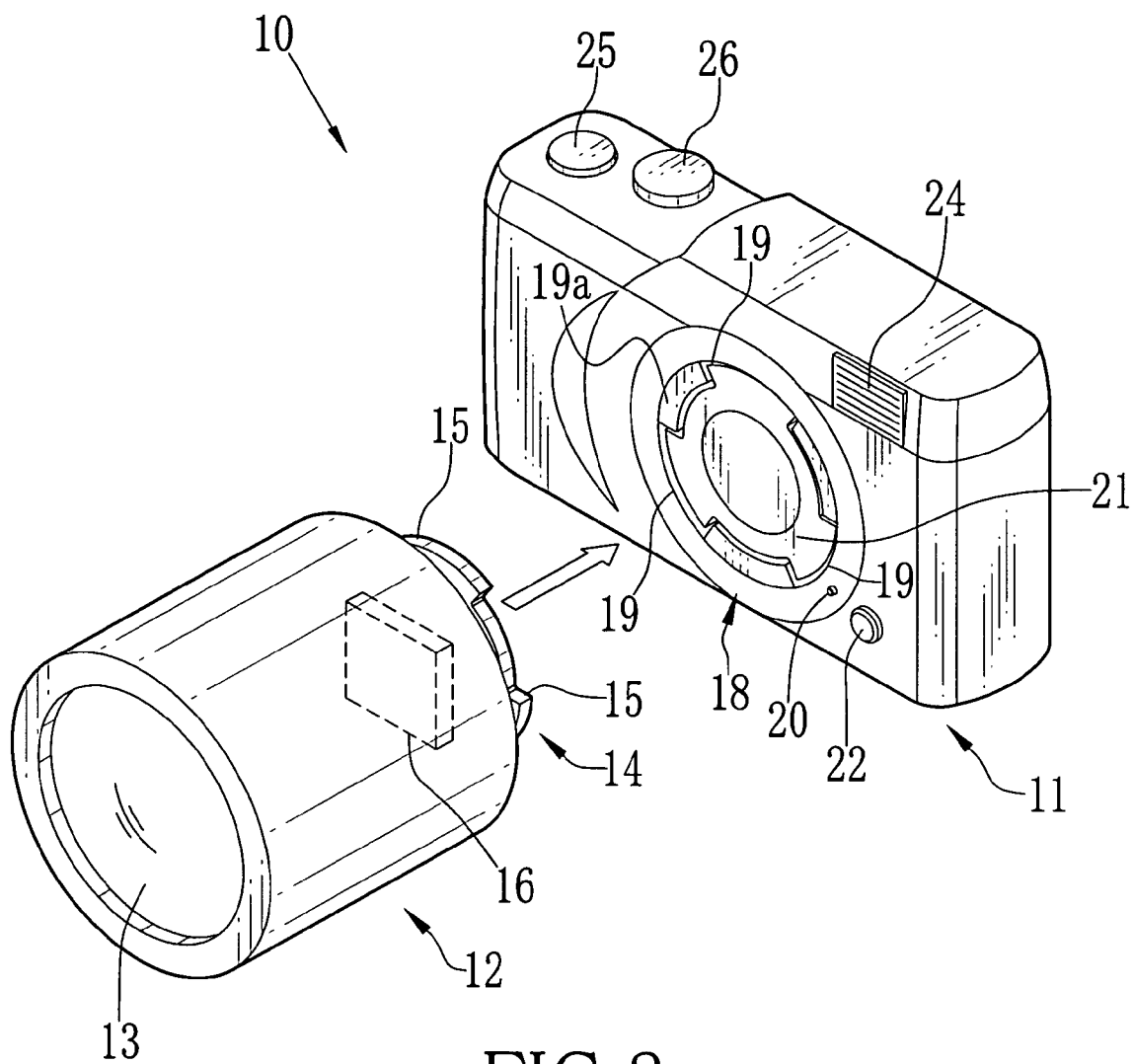
FIG. 1 is a perspective view illustrating a digital camera system in which a lens unit is detached from a camera body.

As shown in FIG. 1, a digital camera system 10 is composed of a camera body 11 and a lens unit 12. The lens unit 12 is removably attached to the camera body 11. At a front surface of the lens unit 12, a taking lens 13 is exposed. A lens side mount portion 14 is formed at a rear surface of the lens unit 12.

The lens side mount portion 14 has three bayonet claws 15 arranged at regular intervals along an outer periphery of the lens side mount portion 14. Inside of the lens unit 12 is provided a CCD image sensor (hereinafter, CCD) 16 for capturing a subject image focused by the taking lens 13. As the lens unit 12, several kinds of the lens units with different focal lengths of the taking lens 13 or with different numbers of pixels in the CCD 16, or those capable of monochrome photography, infrared photography or the like are prepared.

A camera side mount portion 18 is formed at a front surface of the camera body 11. The camera side mount portion 18 has three bayonet gaps 19 arranged at regular intervals along an outer periphery of the camera side mount portion 18. In order to attach the lens unit 12 to the camera body 11, the bayonet claws 15 are forced into the bayonet gaps 19, and the lens unit 12 is rotated in clockwise direction, thereby coupling the bayonet claws 15 with the bayonet claws 19a in a meshed manner.

A mount lid 21 is contained inside the camera side mount portion 18. The mount lid 21 is biased by a spring in a forward direction, so as to prevent dust or the like from entering to the camera body 11 while the lens unit 12 is not attached.

Moreover, the camera side mount portion 18 is provided with a lock pin 20. When the lens unit 12 is attached to the camera body 11, the lock pin 20 becomes engaged with a pin hole (not shown) of the lens side mount portion 14, and rotation of the lens unit 12 is locked. Owing to this, the lens unit 12 is prevented from dropping off from the camera body 11.

A lock release button 22 is located near the camera side mount portion 18. When the lock release button 22 is depressed while the lens unit 12 is attached to the camera body 11, the lock pin 20 is moved backwards and released from the engagement with the pin hole (not shown). When the lock release button 22 is depressed, and the lens unit 12 is rotated, the lens unit 12 is detached from the camera body 11.

Figure 2:
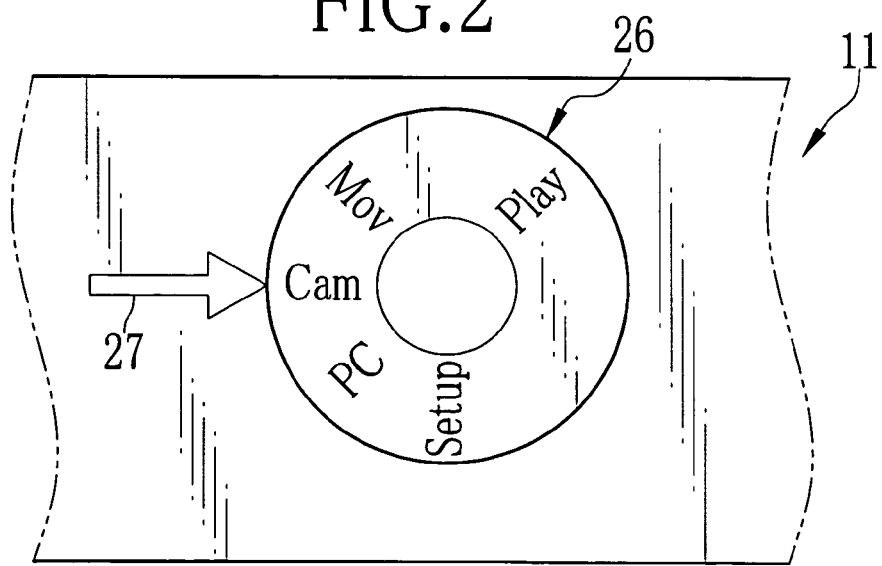
FIG. 2 is a plan view illustrating a mode selection dial.

A flash unit 24 is disposed on the upper front surface of the camera body 11. A shutter button 25 and a mode selection dial 26 are disposed on an upper surface of the camera body 11. The shutter button 25 is depressed when images are captured. The mode selection dial 26 is rotated to select one of a movie capture mode, a still image capture mode, an image transfer mode for transferring the captured images to a personal computer and the like, a setup mode for making various settings, and a playback mode for reproducing recorded images. As shown in FIG. 2, for example, when "Cam" represented on the mode selection dial 26 is positioned to an arrow 27, the still image capture mode is selected. Similarly, "Mov" selects the movie capture mode, "PC" selects the image transfer mode, "Setup" selects the setup mode and "Play" selects the playback mode.

A power operating button 78 (see FIG. 5) and an LCD 71 (see FIG. 5), which are described later, are disposed on a rear surface of the camera body 11 (now shown).

Figure 3:
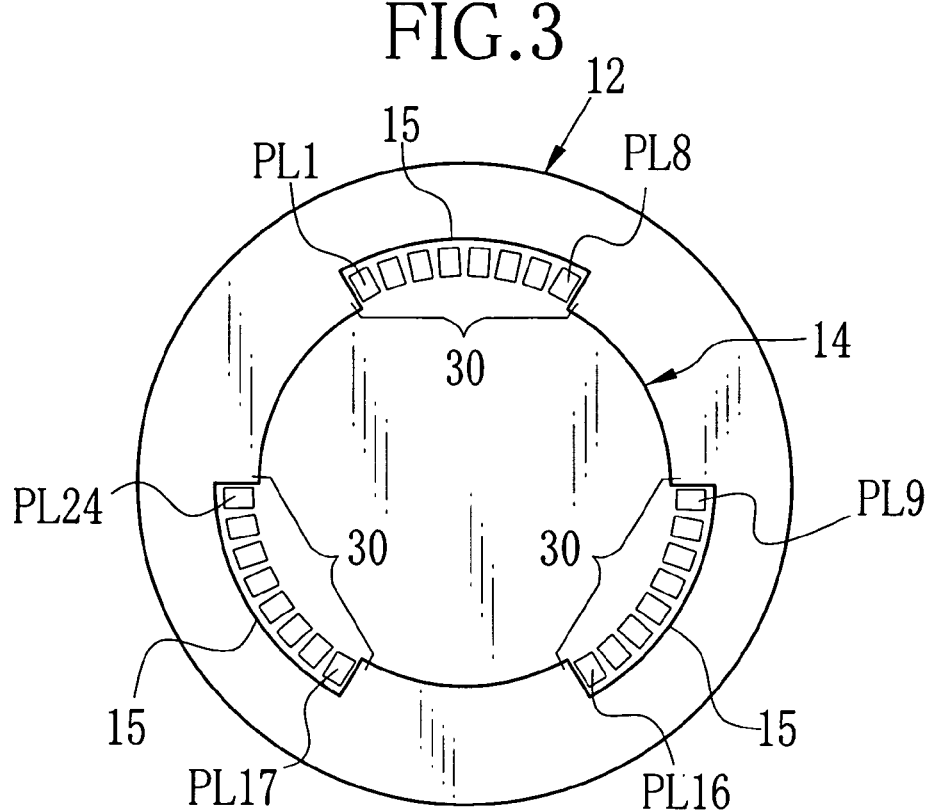
FIG. 3 is a plan view illustrating a lens side mount portion.

As shown in FIG. 3, the lens side mount portion 14 is provided with a lens connection contact group 30. The lens connection contact group 30 is composed of twenty four connection contacts PL1 to PL24. Each bayonet claw 15 has eight connection contacts.

Figure 4:
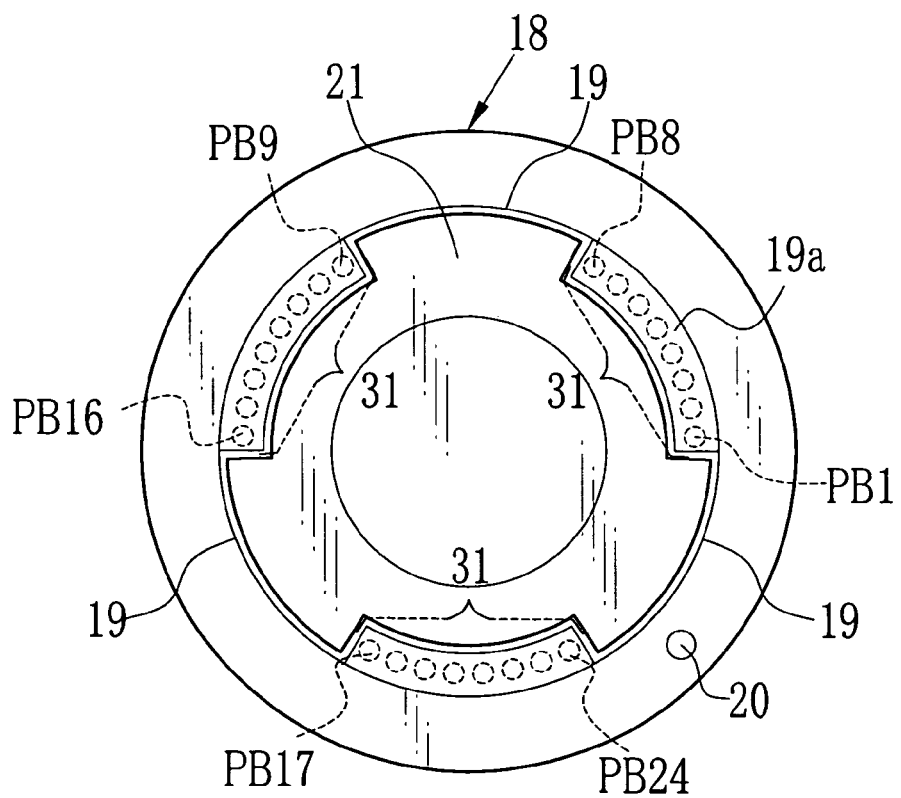
FIG. 4 is a plan view illustrating a camera side mount portion.

As shown in FIG. 4, the camera side mount portion 18 is provided with a camera connection contact group 31. As in the case of the lens connection contact group 30, the camera connection contact group 31 is composed of twenty four connection contacts PB1 to PB24. Each of the connection contacts PB1 to PB24 is connected to each of the connection contacts PL1 to PL24 of the lens unit 12 when the lens unit 12 is attached to the camera body 11. For example, the connection contact PL1 is connected to the connection contact PB1, and the connection contact PL24 is connected to the connection contact PB24.

Figure 5:
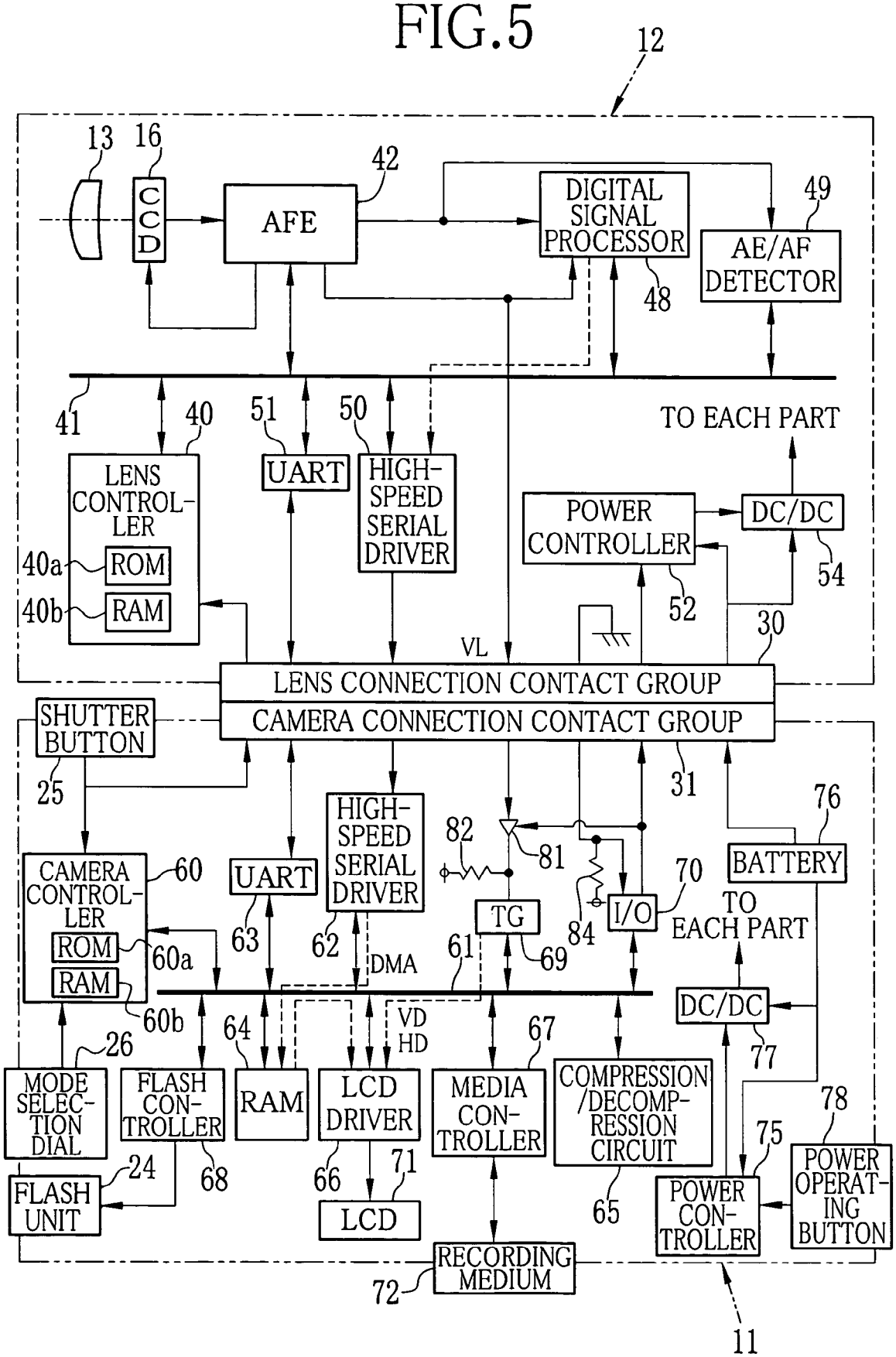
FIG. 5 is a block diagram illustrating an electrical structure of the digital camera system.

As shown in FIG. 5, the lens unit 12 has a lens controller 40 for controlling each part of the lens unit 12. The lens controller 40 is provided with a ROM 40a and a RAM 40b. The ROM 40a stores a program for controlling each part of the lens unit 12. The RAM 40b temporarily stores work data. The lens controller 40 controls each part of the lens unit 12 based on the program stored in the ROM 40a.

Figure 6:
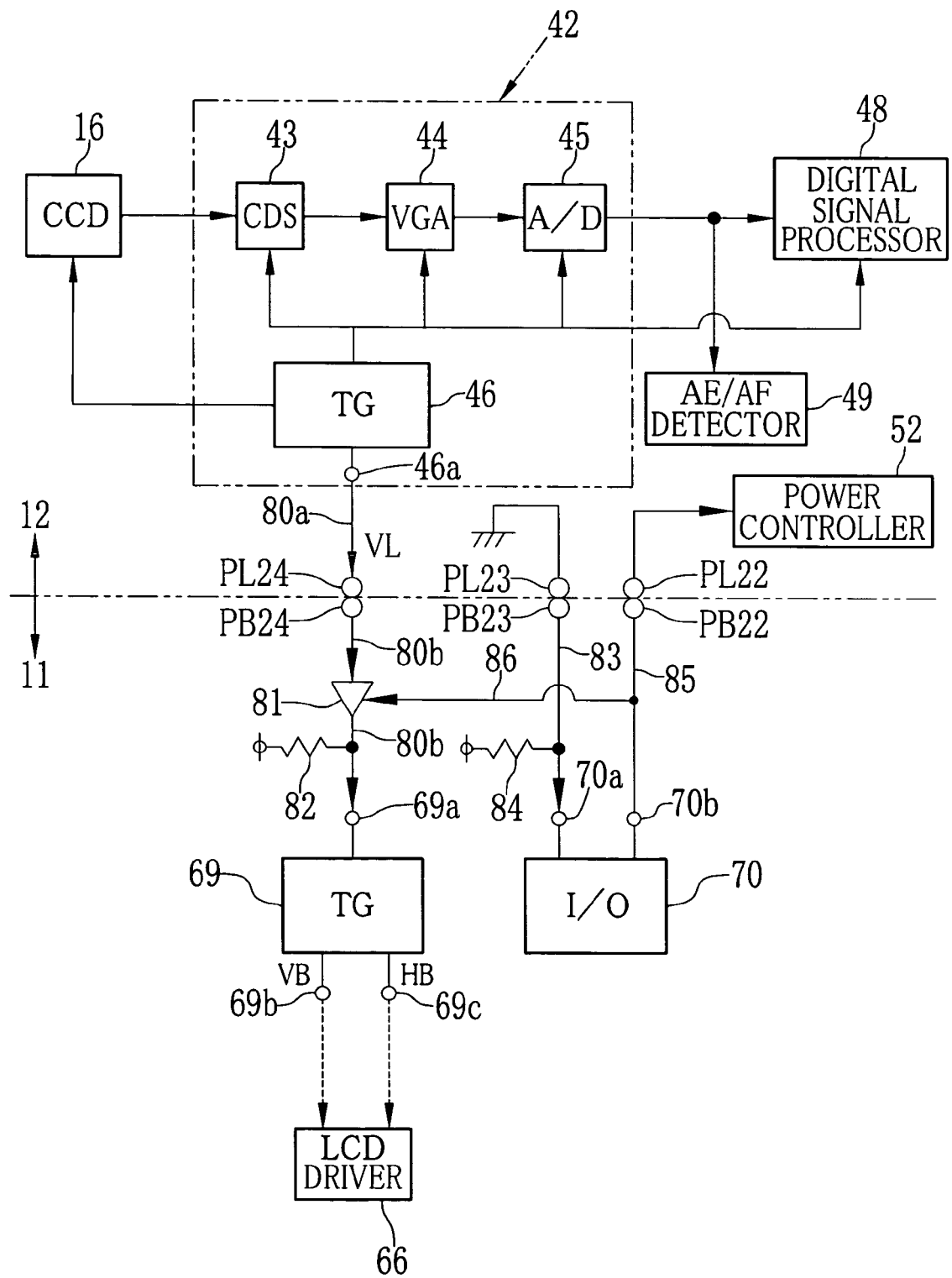
FIG. 6 is a block diagram explaining synchronization between a timing generator in the lens unit and a timing generator in the camera body.

An analog front end (AFE) 42 is connected to the lens controller 40 through a data bus 41, and is controlled by the lens controller 40. As shown in FIG. 6, the AFE 42 has a correlation double sampling circuit (CDS) 43, a variable gain amplifier (VGA) 44, an A/D converter 45 and a timing generator (hereinafter, TG) 46. The TG 46 is a lens side timing generator, and generates a timing signal under the control of the lens controller 40. Based on this timing signal, the CDS 43, VGA 44 and A/D converter 45 are driven.

The TG 46 also generates a horizontal synchronizing signal HL, a vertical synchronizing signal VL and drive signals (H1 to H4, V1 to V8 and the like). The CCD 16 connected to the AFE 42 is driven when the drive signals are input.

The CCD 16 photoelectrically converts the subject image focused by the taking lens 13 into an electric signal and outputs it as an image signal. After noise is removed in the CDS 43, the image signal output from the CCD 16 is amplified in the VGA 44 and then converted into image data in a digital signal form in the A/D converter 45.

A digital signal processor 48 connected to the TG 46 is driven when the timing signal is input from the TG 46. The digital signal processor 48 is also connected to the A/D converter 45 and the image data is input from the A/D converter 45. The digital signal processor 48 applies various image processing such as YC conversion, gradation conversion, white balance correction and the like to the image data.

An AE/AF detector 49 is connected to the A/D converter 45 and the image data is input from the A/D converter 45. The AE/AF detector 49 detects an AE detection value and an AF detection value based on the image data. The AE detection value is a value at which most appropriate exposure is obtained. The AF detection value is a value at which highest integration value of high-frequency components in the image data is obtained.

The AE/AF detector 49 is connected to the lens controller 40 through the data bus 41, and the AE and AF detection values are input to the lens controller 40. The lens controller 40 controls electric shutter speed of the CCD 16 based on the AE detection value, and moves a focus lens of the taking lens 13 to an in-focus position by controlling a motor (not shown) based on the AF detection value.

Besides the lens controller 40, AFE 42, digital signal processor 48 and AE/AF detector 49, a high-speed serial driver 50 and a universal asynchronous receiver transmitter (UART) 51 are also connected to the data bus 41, and controlled by the lens controller 40.

The high-speed serial driver 50 is, for example, a low voltage differential signaling (LVDS) circuit which transfers data by serial transmission. The high-speed serial driver 50 is connected to the lens connection contact group 30. The high-speed serial driver 50 converts the image data of a parallel signal form into a serial signal form, and sends the image data to the camera body 11 through the lens connection contact group 30.

The UART 51 converts the parallel signal into the serial signal and vice versa, and also sends and receives the control signals with the camera body 11. The UART 51 also sends status information to the camera body 11.

A power controller 52 and a DC/DC converter 54 are connected to the lens connection contact group 30, and the DC/DC converter 54 is also connected to the power controller 52. An electric power is supplied to the DC/DC converter 54 from the camera body 11 through the lens connection contact group 30. The power controller 52 controls the DC/DC converter 54 to decrease the voltage supplied from the camera body 11 to a predetermined value. Owing to this, the electric power is supplied to each part of the lens unit 12.

The camera body 11 has a camera controller 60 for controlling each part of the camera body 11. The camera controller 60 is provided with a ROM 60a and a RAM 60b. The ROM 60a stores a program for controlling each part of the camera body 11. The RAM 60b temporarily stores work data. The camera controller 60 controls each part of the camera body 11 based on the program stored in the ROM 60a.

A high-speed serial driver 62, a UART 63, a RAM 64, a compression/decompression circuit 65, an LCD driver 66, a media controller 67, a flash controller 68, a TG 69 and an I/O port 70 are connected to the camera controller 60 through a data bus 61, and controlled by the camera controller 60.

The high-speed serial driver 62 is connected to the camera connection contact group 31. The high-speed serial driver 62 is the LVDS circuit. The high-speed serial driver 62 receives the image data sent from the high-speed serial driver 50 of the lens unit 12 through the camera connection contact group 31, and converts the image data of the serial signal form into the parallel signal form. The image data received by the high-speed serial driver 62 is transferred to the RAM 64 in a direct memory access (DMA) manner. That is, the image data is directly transferred to the RAM 64 without going through the camera controller 60.

The UART 63 sends and receives data such as the control signals with the lens unit 12, like the UART 51.

The compression/decompression circuit 65 applies compression or decompression processing to the image data temporarily stored in the RAM 64. That is, the compression/decompression circuit 65 compresses image data received from the lens unit 12, and decompresses image data recorded in a recording medium 72 when the image data is reproduced. Note that the recording medium 72 is, for example, a memory card removably connected to the camera body 11.

Image data for a through image received from the lens unit 12 or image data recorded in the recording medium 72 are input to the LCD driver 66 and displayed as the through image or the reproduced image on the LCD 71.

The media controller 67 receives image data from the lens unit 12 during the image capturing and records the image data in the recording medium 72 to sort out from the through image data. The media controller 67 also reads out the image data in the recording medium 72. The flash controller 68 controls the flash unit 24 so as to emit flash light.

The TG 69 is a camera body side timing generator, and generates a timing signal under the control of the camera controller 60. Based on this timing signal, each part of the camera body 11 is driven. The I/O port 70 sends and receives signals with the lens unit 12 through the camera connection contact group 31.

A power controller 75 is provided in the camera body 11. A battery 76 and a DC/DC converter 77 are connected to the power controller 75. The battery 76 is also connected to the DC/DC converter 77. The power operating button 78 is connected to the power controller 75.

The power controller 75 is turned ON/OFF by an operation signal input from the power operating button 78. When turned ON, the power controller 75 controls the DC/DC converter 77 to decrease the voltage of the battery 76 to a predetermined value. Owing to this, the electric power is supplied to each part of the camera body 11. The battery 76 is also connected to the camera connection contact group 31 and supplies the electric power to the lens unit 12.

The shutter button 25 is connected to the camera connection contact group 31 and the camera controller 60. The shutter button 25 outputs a shutter signal S1 when it is depressed halfway and outputs a shutter signal S2 when it is fully depressed. The shutter signals S1 and S2 are sent to the camera controller 60 and also to the lens controller 40 through the camera connection contact group 31 and the lens connection contact group 30.

The mode selection dial 26 is connected to the camera controller 60. As mentioned above, the mode selection dial 26 is rotated and outputs a signal corresponding to the rotated position to the camera controller 60. The camera controller 60 sets the mode corresponding to the received signal.

The camera body 11 is provided with two drive modes: a first mode and a second mode. In the first mode, the TG 69 in the camera body 11 is controlled by the TG 46 in the lens unit 12, and each part of the camera body 11 is driven in synchronization with the operation of the lens unit 12. In the second mode, each part of the camera body 11 is driven without synchronizing with the operation of the lens unit 12.

The camera controller 60 switches between these two drive modes when the mode selection dial 26 is operated. The camera controller 60 sets the drive mode to the first mode when the still image capture mode or the movie capture mode is selected. The camera controller 60 sets the drive mode to the second mode when the mode other than the above capture modes, that is, the image transfer mode, setup mode or playback mode is selected. Note that the lens unit 12 may be provided with an operating member for switching these two modes.

Hereinafter, a changeover between the first mode and the second mode is explained. As shown in FIG. 6, the TG 46 in the lens unit 12 has an output terminal 46a for outputting the vertical synchronizing signal VL (reset signal). The output terminal 46a is connected to the connection contact PL24 (first contact) through a signal line 80a. The TG 69 in the camera body 11 has an input terminal 69a for receiving the reset signal. The input terminal 69a is connected to the connection contact PB24 (second contact) through a signal line 80b and a buffer 81. A pull-up resister 82 is also connected to the input terminal 69a.

When the lens unit 12 is attached to the camera body 11, the lens side connection contact PL24 and the camera body side connection contact PB24 are connected, thereby electrically connecting the TG 46 and the TG 69 through the signal lines 80a and 80b. Note that the connection contacts PL24 and PB24 are explained as an example here, but other connection contacts can be used for this purpose as well.

The I/O port 70 has an input terminal 70a and an output terminal 70b. The input terminal 70a is connected to the connection contact PB23 through a signal line 83. A pull-up resister 84 is also connected to the input terminal 70a. The output terminal 70b is connected to the connection contact PB22 through a signal line 85. Moreover, the output terminal 70b is connected to the buffer 81 through a signal line 86. The lens unit side connection contact PL23 is grounded and the connection contact PL22 is connected to the power controller 52.

When the lens unit 12 is not attached the camera body 11, an electric potential of the input terminal 70a is increased to, for example, about 5 volts by the pull-up resister 84 and a High-signal is input to the input terminal 70a. When the lens unit 12 is attached to the camera body 11, the connection contacts PL23 and PB23 are connected to each other. The connection contact PL23 is grounded, and therefore the electric potential of the input terminal 70a becomes 0 volt. Accordingly, a Low-signal is input to the input terminal 70a. When receiving the Low-signal, the I/O port 70 detects the attachment of the lens unit 12 to the camera body 11.

The I/O port 70 outputs a power control signal from the output terminal 70b under the control of the camera controller 60. The power control signal is input to the power controller 52 through the connection contacts PB22 and PL22. When the still image capture mode or the movie capture mode which activates the lens unit 12 is selected, an ON-signal as the power control signal for turning on the power of the lens unit 12 is output from the output terminal 70b. When the mode which activates the camera body 11 without activating the lens unit 12 is selected, an OFF-signal is output from the output terminal 70b. Upon receiving the ON-signal, the power controller 52 starts supplying the electric power to each part of the lens unit 12. Upon receiving the OFF-signal, the power controller 52 stops supplying the electric power.

The power control signal is also input to the buffer 81 through the signal line 86 to control the output of the buffer 81. When the power of the lens unit 12 is turned off (when the OFF-signal is input to the buffer 81), the output of the buffer 81 is at high impedance, and the vertical synchronizing signal VL is not output from the buffer 81. As a result, the voltage of the input terminal 69a is increased by the pull-up resister 82, and the High-signal is input to the I/O port 70. Accordingly, each part of the camera body 11 is driven in accordance with the timing led by the camera body side TG 69.

When the power of the lens unit 12 is turned on (when the ON-signal is input to the buffer 81), the output of the buffer 81 becomes active, and the vertical synchronizing signal VL is output from the buffer 81. The vertical synchronizing signal VL is input to the input terminal 69a as the reset signal. As a result, the TG 69 is reset and restarted. Accordingly, each part of the camera body 11 is driven in accordance with the timing led by the lens side TG 46.

The TG 69 has output terminals 69b and 69c. The output terminal 69b outputs a vertical drive signal VB, and the output terminal 69c outputs a horizontal drive signal HB. These drive signals VB and HB are input to the LCD driver 66.

In the still image capture mode or the movie capture mode, the CCD 16 in the lens unit 12 is driven. At this time, the TG 69 in the camera body 11 is synchronized with the TG 46 in the lens unit 12, and thereby synchronizing the LCD driver 66 as well. Owing to this, the display of the LCD 71 is synchronized with the CCD 16.

Hereinafter, operation of the digital camera system 10 having the above configuration is explained with referring to a flow chart in FIG. 7. When turned ON by operating the power operating button 78, the power controller 75 starts supplying the electric power to each part of the camera body 11.

When the mode selection dial 26 is operated, the selected mode is determined. When the still image capture mode or the movie capture mode is selected, the first mode is set. At this time, the ON-signal is output from the output terminal 70b of the I/O port 70. The ON-signal is input to the power controller 52 and the power of the lens unit 12 is turned ON.

The ON-signal output from the output terminal 70b is also input to the buffer 81. Owing to this, the output of the buffer 81 becomes active, and the vertical synchronizing signal VL as the reset signal is input to the input terminal 69a of the TG 69.

Figure 8:
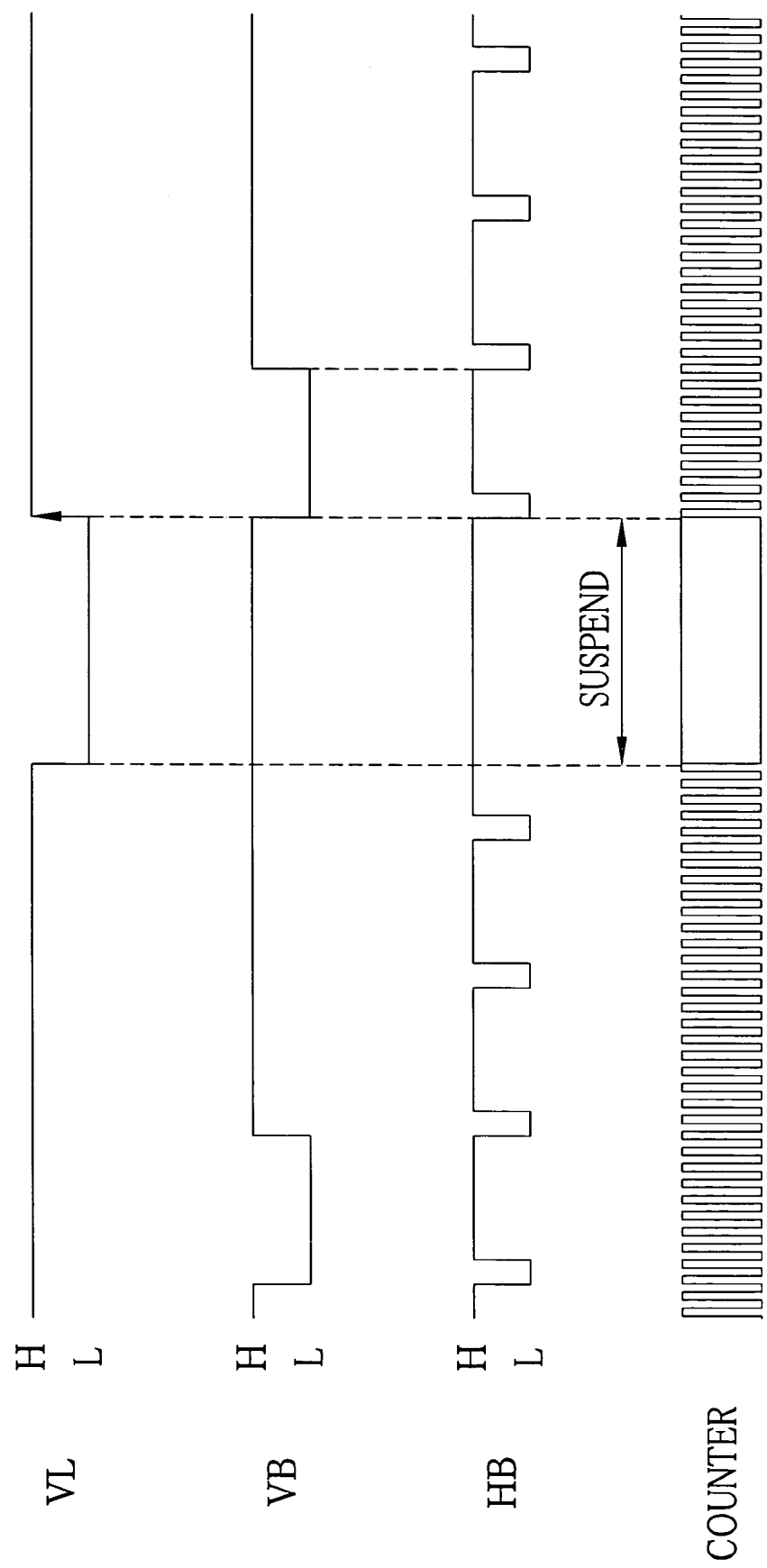
FIG. 8 is a timing chart explaining reset and restart of a vertical drive signal VB and a horizontal drive signal HB by an input of a vertical synchronizing signal VL.

As shown in FIG. 8, a counting operation for the timing signal generation is suspended when the vertical synchronizing signal VL input to the input terminal 69a is in a Low state. When the vertical synchronizing signal VL changes from the Low state to a High state, the timing signal generation is restarted at a predetermined pattern (an initial pattern of each signal HB and VB).

Figure 9:
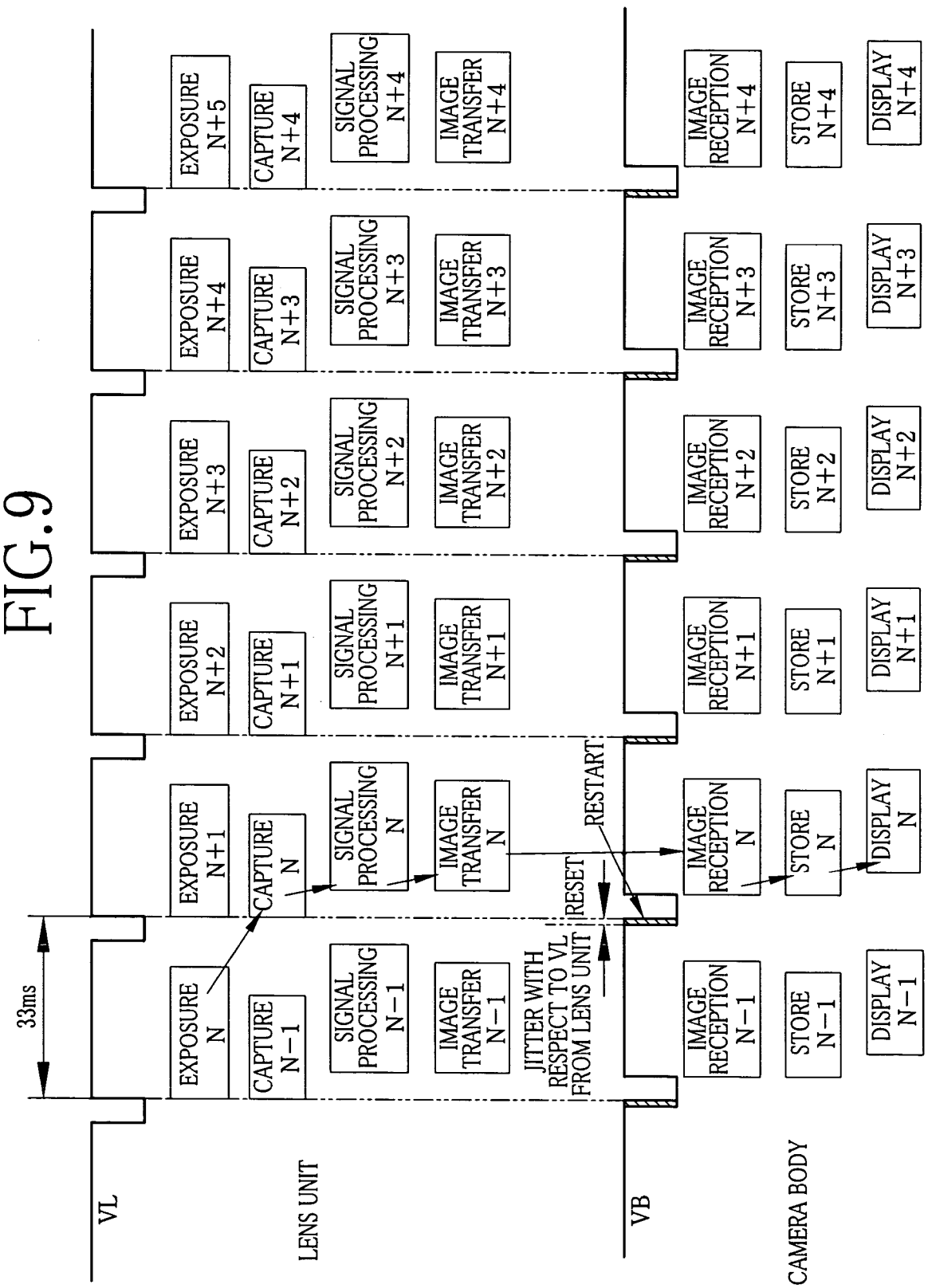
FIG. 9 is a flow chart explaining synchronization processing between operation of the lens unit and operation of the camera body with V-cycle at 33 ms when a through image is displayed.

Hereinafter, a synchronization processing between the lens unit 12 and the camera body 11 when a through image is displayed is explained. As shown in FIG. 9, V-cycle of a through image in the lens unit 12 is, for example, 33 ms (30 frames/sec).

By sending and receiving the control signals through the UARTs 51 and 63, the lens unit 12 and the camera body 11 control the TGs 46 and 69 to have the V-cycle of about 33 ms, respectively. However, the vertical synchronizing signal VL output from the TG 46 of the lens unit 12 and the vertical drive signal VB output from the TG 69 of the camera body 11 do not completely synchronize since jitter arises due to disturbance in waveform of the electric signals. Therefore, the vertical synchronizing signal VL from the lens unit 12 forcibly resets and restarts the TG 69. Owing to this, the lens unit 12 and the LCD 71 of the camera body 11 work in synchronization.

FIG. 10 shows a case in which the TGs 46 and 69 are controlled to have the V-cycle of about 50 ms by sending and receiving of the control signals through the UARTs 51 and 63. Also in this case, the vertical synchronizing signal VL from the lens unit 12 forcibly resets and restarts the TG 69. Owing to this, the lens unit 12 and the LCD 71 of the camera body 11 work in synchronization.

Figure 7:
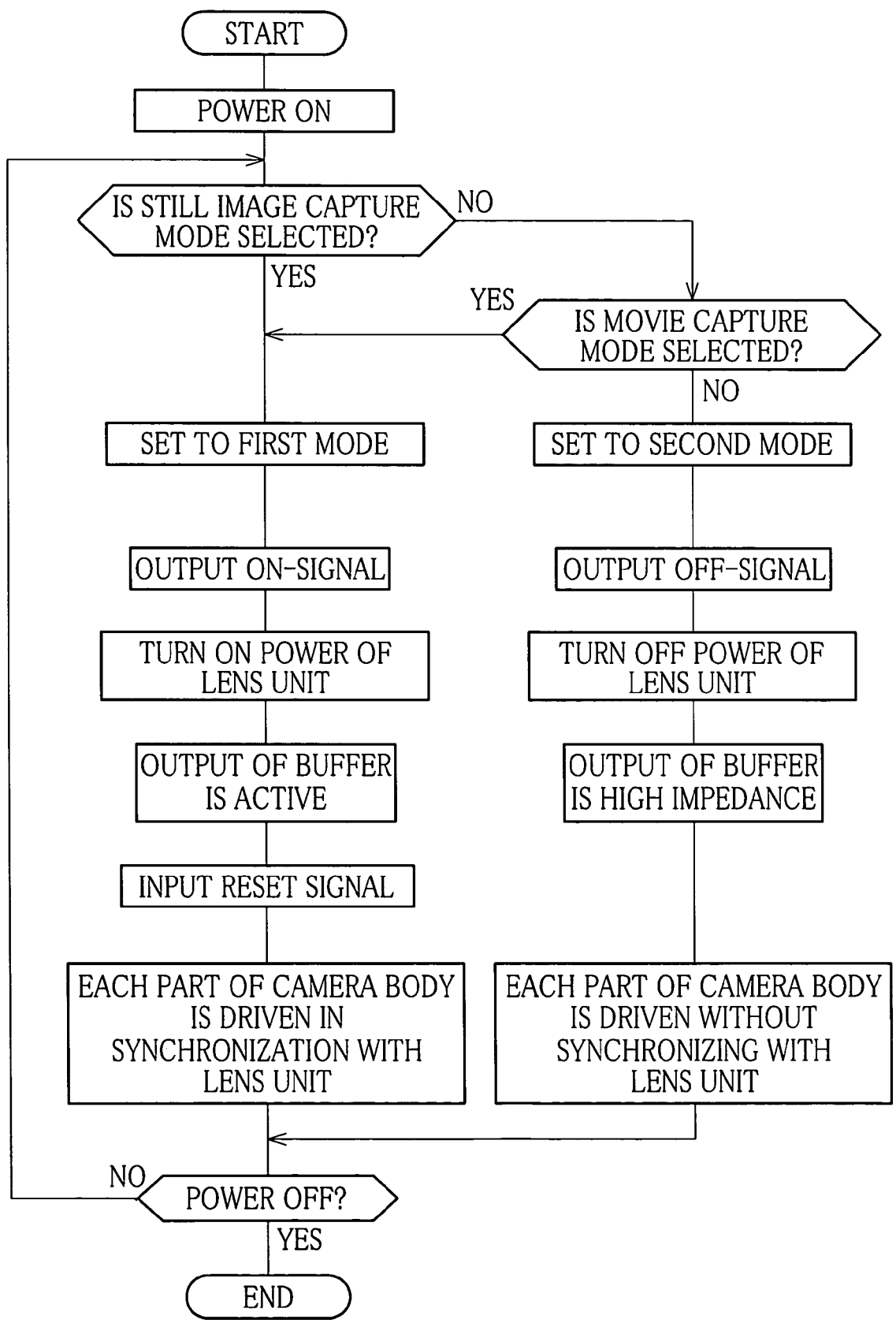
FIG. 7 is a flow chart explaining operation of the digital camera system.

In FIG. 7, when the mode other than the still image capture mode or the movie capture mode, that is, the image transfer mode, setup mode or playback mode is selected, the second mode is set. At this time, the OFF-signal is output from the output terminal 70b of the I/O port 70. The OFF-signal is input to the power controller 52 and the power of the lens unit 12 is turned OFF.

The OFF-signal output from the output terminal 70b is also input to the buffer 81. Owing to this, the output of the buffer 81 is at high impedance, and the vertical synchronizing signal VL is not input to the input terminal 69a of the TG 69. Since the TG 69 is not reset by the vertical synchronizing signal VL, the camera body 11 executes various processing without synchronizing with the lens unit 12.

Thereafter, it is determined whether the power of the camera body 11 is turned OFF or not. When the camera body 11 is determined to be not turned OFF, the digital camera system 10 goes back to the process of determining the selected mode.

When the camera body 11 is determined to be turned OFF, the digital camera system 10 finishes the operation.

In the above embodiment, the present invention is applied to the digital still camera. However, the present invention is also applicable to digital video cameras. Moreover, the present invention can be applied to TV phones and personal computers with cameras.

Various changes and modifications are possible in the present invention and may be understood to be within the present invention.

What is claimed is:

1. A digital camera system including a lens unit having a taking lens and a solid state imaging device, and a camera body to which said lens unit is removably attached, said digital camera system comprising:
   a lens side timing generator provided in said lens unit for controlling drive timing of each part of said lens unit;
   a camera body side timing generator provided in said camera body for controlling drive timing of each part of said camera body; and
   a mode selector for selecting one of a first mode and a second mode, operation of said camera body side timing generator being controlled by said lens side timing generator in said first mode, the operation of said camera body side timing generator not being controlled by said lens side timing generator in said second mode,
wherein said lens side timing generator has an output terminal for outputting a reset signal which resets said camera body side timing generator and said camera body side timing generator has an input terminal for receiving said reset signal, when said reset signal is input to said input terminal in said first mode, said camera body side timing generator being restarted.

2. A digital camera system as claimed in claim 1, wherein when an image capture mode is selected, said mode selector selects said first mode and when a mode other than said image capture mode is selected, said mode selector selects said second mode.

3. A digital camera system as claimed in claim 1, wherein said lens unit has a first contact connected to said output terminal and said camera body has a second contact connected to said input terminal, when said lens unit is attached to said camera body, said first and second contacts making a contact with each other, and said output and input terminals being electrically connected to each other.

4. A digital camera system as claimed in claim 1, wherein said reset signal is a vertical synchronizing signal generated by said lens side timing generator for driving said solid state imaging device.

5. A digital camera to which a lens unit having a taking lens, a solid state imaging device and a lens side timing generator is removably attached, comprising:
   a camera body side timing generator for controlling drive timing of each part of said digital camera; and
   a mode selector for selecting one of a first mode and a second mode, operation of said camera body side timing generator being controlled by said lens side timing generator in said first mode, the operation of said camera body side timing generator not being controlled by said lens side timing generator in said second mode, and
   wherein said camera body side timing generator has an input terminal for receiving a reset signal output from said lens side timing generator, when said reset signal is input to said input terminal in said first mode, said camera body side timing generator being restarted.

* * * * *